United States Patent
Jo et al.

(10) Patent No.: US 11,530,738 B2
(45) Date of Patent: Dec. 20, 2022

(54) PULLEY STOPPER AND PULLEY APPARATUS INCLUDING THE SAME

(71) Applicant: LG CHEM, LTD., Seoul (KR)

(72) Inventors: Ju Hyun Jo, Daejeon (KR); Yun Deok Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 6 days.

(21) Appl. No.: 16/754,195

(22) PCT Filed: Aug. 12, 2019

(86) PCT No.: PCT/KR2019/010226
§ 371 (c)(1),
(2) Date: Apr. 7, 2020

(87) PCT Pub. No.: WO2020/096178
PCT Pub. Date: May 14, 2020

(65) Prior Publication Data
US 2021/0215233 A1    Jul. 15, 2021

(30) Foreign Application Priority Data

Nov. 8, 2018   (KR) .................. 10-2018-0136600

(51) Int. Cl.
*F16H 7/08*    (2006.01)
*F16H 7/02*    (2006.01)
(Continued)

(52) U.S. Cl.
CPC .............. *F16H 7/08* (2013.01); *F16H 7/02* (2013.01); *F16H 7/20* (2013.01); *F16H 7/24* (2013.01);
(Continued)

(58) Field of Classification Search
CPC ... F16H 7/02; F16H 7/023; F16H 7/08; F16H 7/18; F16H 2007/185; F16H 7/20; F16H 7/22; F16H 7/24; F16H 2007/0865; F16H 7/12; F16H 7/14; F16G 3/07; F16G 3/10; F16G 3/16; F16G 7/04; F16G 11/04; F16G 11/044; F16G 11/10; F16G 11/101;
(Continued)

(56) References Cited

U.S. PATENT DOCUMENTS

| 5,401,011 A | 3/1995 | Gatenby et al. |
| 5,431,371 A | 7/1995 | Daniels et al. |

(Continued)

FOREIGN PATENT DOCUMENTS

| CN | 101910679 A | 12/2010 |
| CN | 205118121 U | 3/2016 |

(Continued)

*Primary Examiner* — Michael R Mansen
*Assistant Examiner* — Raveen J Dias
(74) *Attorney, Agent, or Firm* — Dentons US LLP

(57) ABSTRACT

A pulley stopper including: a clamp portion that includes a bar-shaped upper clamp and a bar-shaped lower clamp; and a pair of fasteners that are disposed at opposite ends of the clamp portion to couple the upper clamp and the lower clamp. The pair of fasteners and the clamp portion are coupled such that the upper clamp and the lower clamp are fixed side by side through the coupling of the fastener and the movement of a belt disposed between the upper clamp and the lower clamp is stopped.

11 Claims, 5 Drawing Sheets

(51) Int. Cl.
*F16H 7/20* (2006.01)
*F16H 7/24* (2006.01)
*B63B 21/08* (2006.01)

(52) U.S. Cl.
CPC ...... *B63B 21/08* (2013.01); *F16H 2007/0842* (2013.01)

(58) Field of Classification Search
CPC ...... F16G 11/105; F16G 11/108; B63B 21/08; F02B 67/00; F02B 67/04; F02B 67/06
See application file for complete search history.

(56) References Cited

U.S. PATENT DOCUMENTS

| | | | |
|---|---|---|---|
| 5,725,269 | A | 3/1998 | Daniels et al. |
| 6,068,318 | A | 5/2000 | Freund |
| 6,068,567 | A * | 5/2000 | Thompson ............... F16H 7/08 474/101 |
| 7,507,172 | B2 | 3/2009 | Lehtovaara et al. |
| 8,267,819 | B2 | 9/2012 | Lehtovaara et al. |
| 8,393,986 | B2 | 3/2013 | Young |
| 8,701,867 | B2 | 4/2014 | Costanzo et al. |
| 8,858,375 | B2 | 10/2014 | Young |
| 9,297,406 | B2 | 3/2016 | Young |
| 10,288,148 | B2 * | 5/2019 | Puryk .................... A01D 61/02 |
| 2008/0060171 | A1 * | 3/2008 | Lindemann ............... F16G 3/16 24/31 R |
| 2011/0062644 | A1 | 3/2011 | Zehnder et al. |
| 2015/0258658 | A1 | 9/2015 | Steingruber et al. |
| 2016/0341290 | A1 * | 11/2016 | Lin .......................... F16H 7/02 |

FOREIGN PATENT DOCUMENTS

| | | | |
|---|---|---|---|
| CN | 107630985 | A | 1/2018 |
| JP | 58000652 | A | 1/1983 |
| JP | 2004132391 | A | 4/2004 |
| JP | 2004174160 | A | 6/2004 |
| JP | 2004174160 | A * | 6/2004 |
| JP | 2004316759 | A | 11/2004 |
| JP | 2005511984 | A | 4/2005 |
| JP | 2009-008220 | A | 1/2009 |
| JP | 2011526236 | A | 10/2011 |
| KR | 20-19900006565 | U | 4/1990 |
| KR | 10-19980003513 | A | 3/1998 |
| KR | 10-20050040319 | A | 5/2005 |
| KR | 10-1069739 | B1 | 9/2011 |
| KR | 10-1336264 | B1 | 12/2013 |
| KR | 10-20170083303 | A | 7/2017 |
| WO | 2005/024272 | A1 | 3/2005 |
| WO | 2010/082765 | A2 | 7/2010 |

* cited by examiner

PULLEY STOPPER AND PULLEY APPARATUS INCLUDING THE SAME

CROSS-REFERENCE TO RELATED APPLICATIONS

This application is a U.S. national stage of international Application No. PCT/KR2019/010226 filed on Aug. 12, 2019, and claims priority to and the benefit of Korean Patent Application No. 10-2018-0136600 filed on Nov. 8, 2018, the entire contents of which are incorporated by reference as if fully set forth herein.

TECHNICAL FIELD

The present invention relates to a pulley stopper and a pulley apparatus including the same, and more particularly, it relates to a pulley stopper that stops movement of a belt, and a pulley apparatus including the same.

BACKGROUND

A V-belt is a V-shaped belt made of cloth and rubber, which is used by wrapping it on a V-shaped pulley. After replacing or motoring a current V-belt, as a method for determining whether or not a device is normally barred, the pulley or the V-belt is barred by hand. That is the V-belt is manually barred. As described above, during the manual process, a problem such as an accident in which a body part such as a user's finger is caught between the pulley and the V-belt due to inertia of a facility, which is a weighted object, often occurs.

For some pulleys, although manual barring equipment is in-house built and in use, since the pulley is very diverse in shape and size, there is no equipment that can be used universally. Further, in case of specific work requiring fixing of the pulley, a shaft of the pulley is fixed by using a pipe wrench or the like. However, in this case, a coating of the shaft is damaged, and the pulley and the V-belt may also be damaged.

In the present invention, to alleviate the above problems, it is necessary to develop universal equipment that can fix pulleys of various sizes and shapes while minimizing damage to pulleys and V-belts.

SUMMARY

Exemplary embodiments of the present invention have been made in an effort to solve the above-stated problems of conventional methods. The exemplary embodiments of the present invention provide a pulley stopper, and a pulley device including the same, to provide a highly versatile stopper for various types of pulleys and V-belts, and to facilitate the fastening operation of the stopper by simplifying the fastening process.

However, the problems to be solved by the exemplary embodiments of the present invention are not limited to the above-described problem, and can be variously extended in a range of technical ideas included in the present invention.

A pulley stopper according to an exemplary embodiment of the present invention includes: a clamp portion that includes a bar-shaped upper clamp and a bar-shaped lower clamp; and fasteners that are respectively disposed at opposite ends of the clamp portion to couple the upper clamp and the lower clamp, wherein the fasteners and the clamp portion are coupled by using a clip-type method, and thus the upper clamp and the lower clamp are fixed side by side through the coupling of the fastener such that movement of a belt disposed between the upper clamp and the lower clamp is stopped.

The lower clamp may include a pin coupling portion to which one end of the fastener is coupled by a pin-coupling method, and the other end of the fastener may be rotatable about a fixed axis of the pin coupling portion.

A groove through which that fastener moves while the end of the fastener rotates may be formed in each side surface of the upper clamp and the lower clamp.

The other end of the fastener may be coupled to the upper clamp through rotation of the nut of the fastener by a bolt-nut coupling method such that a gap between the upper clamp and the lower clamp that are disposed side by side may be adjusted.

The pulley stopper may further include a washer provided in a portion where the nut of the fastener and the upper clamp contact each other.

A material of the washer may be made of brass.

A material of the bolt of the fastener may be monomer casting nylon (M/C nylon), phosphor bronze casting (PBC), and brass.

The fastener may include: a first fastener that is disposed at one end of the clamp portion; and a second fastener that is disposed in parallel with the first fastener at the other end of the clamp portion.

At least one of the first fastener and the second fastener may be formed as a clip-type.

A material of the clamp portion may be monomer casting (M/C) nylon.

A material of the clamp portion may be polyoxymethylene (POM).

In addition, a pulley apparatus according to another exemplary embodiment of the present invention may include the above-described pulley stopper.

According to exemplary embodiments of the present invention, a pulley stopper coupled by a clip method can be used to simplify a fastening process and facilitate a fastening operation of the stopper, and thus it is possible to increase versatility of the stopper.

DETAILED DESCRIPTION

Figure 1:
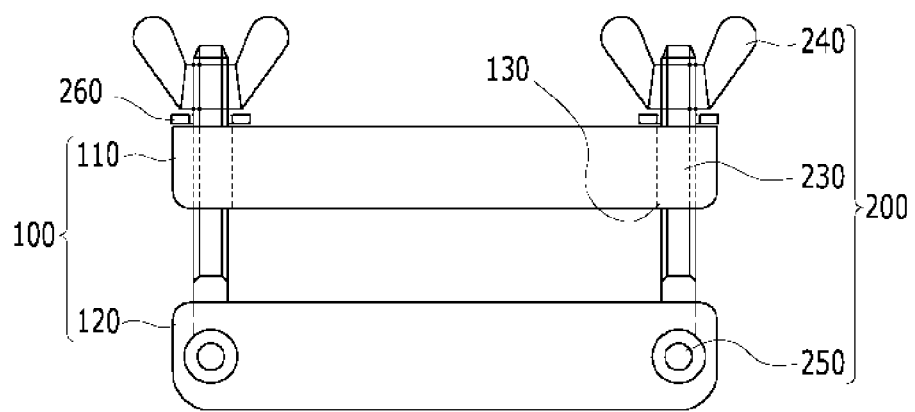
FIG. 1 is a front view of a pulley stopper according to an exemplary embodiment.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, the size and thickness of each configuration shown in the drawing is arbitrarily shown for convenience of description, and therefore, the present invention is not necessarily limited to that shown. In the drawings, the thickness of layers, films, panels, regions, etc., are exaggerated for clarity. In the drawings, for convenience of explanation, the thicknesses of some layers and regions are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, throughout the specification, the word "on" means positioning on or below the object portion, but does not essentially mean positioning on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Figure 2:
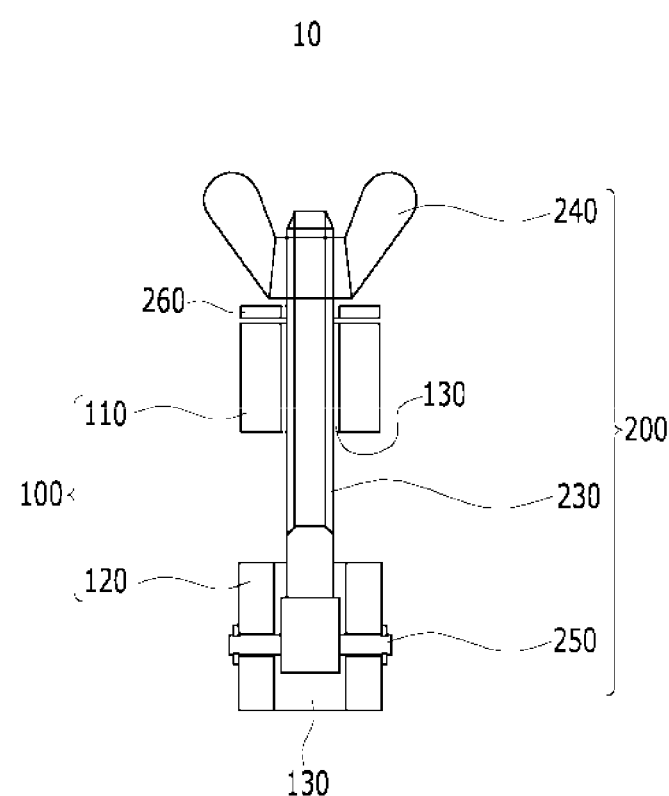
FIG. 2 is a side view of the pulley stopper of FIG. 1.

FIG. 1 is a front view of a pulley stopper according to an exemplary embodiment of the present invention, and FIG. 2 is a side view of the pulley stopper of FIG. 1.

As shown in FIG. 1 and FIG. 2, a pulley stopper 10 according to an exemplary embodiment of the present invention includes a clamp portion 100 including bar-shaped upper and lower clamps 110 and 120, respectively, and a pair of fasteners 200 that are disposed at opposite ends of the clamp portion 100 to combine the upper clamp 110 and the lower clamp 120.

The fasteners 200 and the clamp portion 100 are coupled by using a clip-type method. A moving method of the fastener 200 using the clip-type method will be described in detail with reference to FIG. 3. First, as a configuration for enabling the fastener 200 to move through a clip-type method as shown in FIG. 1 and FIG. 2, a pin coupling portion 250 to which one end of the fastener 200 is coupled by a pin-coupling method, may be included in the lower clamp 120. When the fastener 200 moves while rotating about the pin coupling portion 250 as an axis, grooves 130 through which the fastener 200 moves while the other end of the fastener 200 bars may be formed at each side surface of the upper clamp 110 and the lower clamp 120 as paths for movement of the fastener 200. Each groove 130 is a gap that is sufficient to allow bolts 230 of the fastener 200 to pass therethrough, which may serve as a moving passage of the bolts 230 and simultaneously hold the bolts 230.

Figure 3A:
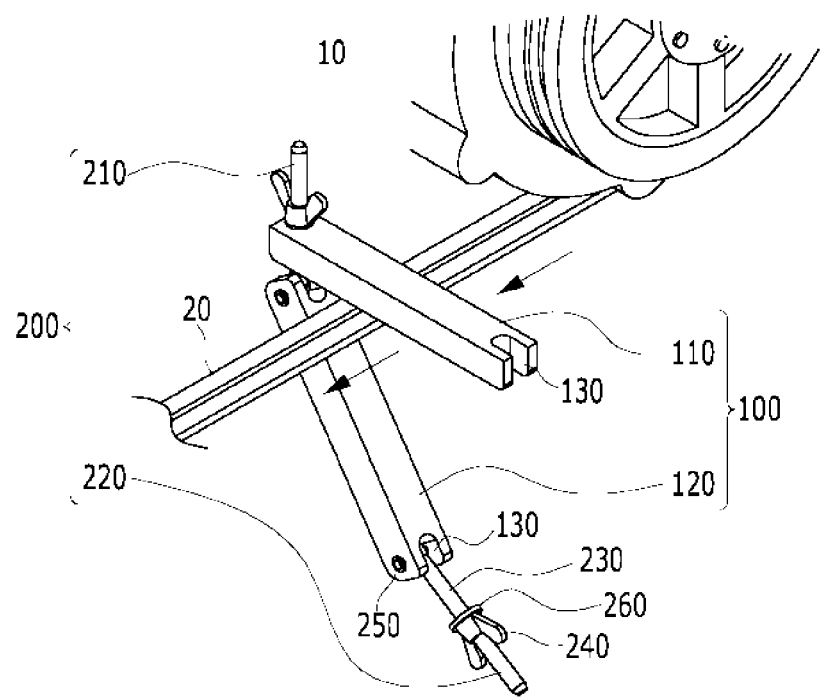
FIG. 3A is an illustration of the pulley stopper of FIG. 1 before coupling.
Figure 3B:
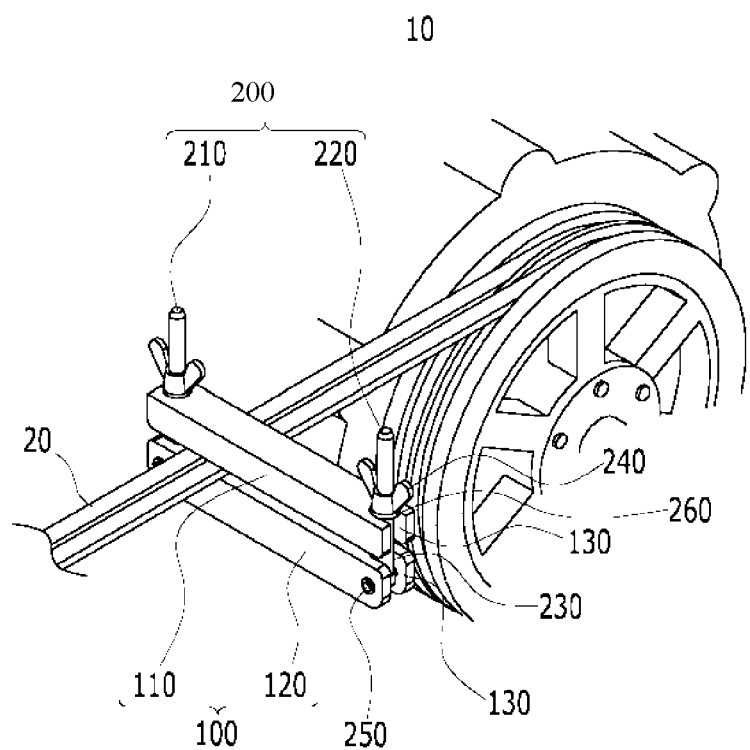
FIG. 3B is an illustration of the pulley stopper of FIG. 1 after coupling.

FIG. 3A is an illustration of the pulley stopper of FIG. 1 before coupling, and FIG. 3B is an illustration of the pulley stopper of FIG. 1 after coupling.

As shown in FIG. 3A and FIG. 3B, the other end of the fastener 200 can rotate about a fixed axis of the pin coupling portion 250, and thus may be coupled in a manner of being inserted into and removed from the groove 130 of the upper clamp 110. FIG. 3A shows a state of the fastener 200 removed from the groove 130 of the upper clamp 130, and thus a gap between the upper clamp 110 and the lower clamp 120 can be widened such that the belt 20 can move through the widened space. FIG. 3B shows a state of the fastener 200 inserted into the groove 130 of the upper clamp 110, and the upper clamp 110 and the lower clamp 120 are coupled side by side in a fixed manner with a narrow gap therebetween through the coupling of the fastening portion 200 such that movement of the belt 20 disposed between the upper clamp 110 and the lower clamp 120 can be stopped.

The fastening portion 200 may include a first fastener 210 disposed at one end of the clamp portion 100, and a second fastener 220 that is disposed in parallel with the first fastener 210 at the other end of the clamp portion 100. In FIG. 1 to FIG. 3, the first fastener 210 and the second fastener 220 are both illustrated as a clip type, but this is not restrictive. Only one of the first fastener 210 and the second fastener 220 may be formed as the clip type. That is, at least one of the first fastener 210 and the second fastener 220 may be formed as the clip type. In this case, the clamp portion 100 coupled to the other fastener 200, which is not formed as the clip type, is in a state such that the groove 130 is not formed therein, and thus the fastener 200 may be fixed to the clamp portion 100 by being inserted therein.

A material of the bolt 230 of the fastener 200 may be monomer casting nylon (M/C nylon), PBC, or brass, and a material of the clamp 100 may be M/C nylon, but this is not restrictive. Depending on exemplary embodiments, the material of the clamp portion 100 may be polyoxymethylene (POMe), and may prevent damage to the pulley and the V belt 20 due to friction with the clamp portion 100.

As shown in FIG. 1 to FIG. 3, the other end of the fastener 200 has a bolt 230-nut 240 coupling, and the other end of the fastener 200 is coupled to the upper clamp 110 through rotation of the nut 240 of the fastener 200 such that the upper clamp 110 and the lower clamp 120 can be fixed side by side. That is, when the upper clamp 110 and the lower clamp 120 are disposed in parallel with each other, a gap between the upper clamp 110 and the lower clamp 120 can be adjusted through the rotation of the nut 240. As described, the belt 20 can be stopped by applying the pulley stopper 10 of the present invention to the belt 20 of various thicknesses by adjusting the gap between the upper clamp 110 and the lower clamp 120.

In addition, the pulley stopper 10 may further include a washer 260 at a portion where the nut 240 of the fastener 200 and the upper clamp 110 contact each other. Since a ring-shaped washer 260 is disposed in a portion where the bolt 230 and the nut 240 are fixed, pressure applied to the corresponding portion can be dispersed, thereby protecting a working surface, and the waster 260 can increase a fastening effect of the bolt 230 and the nut 240. The washer 260 may be made of brass, but it is not restrictive.

Figure 4:
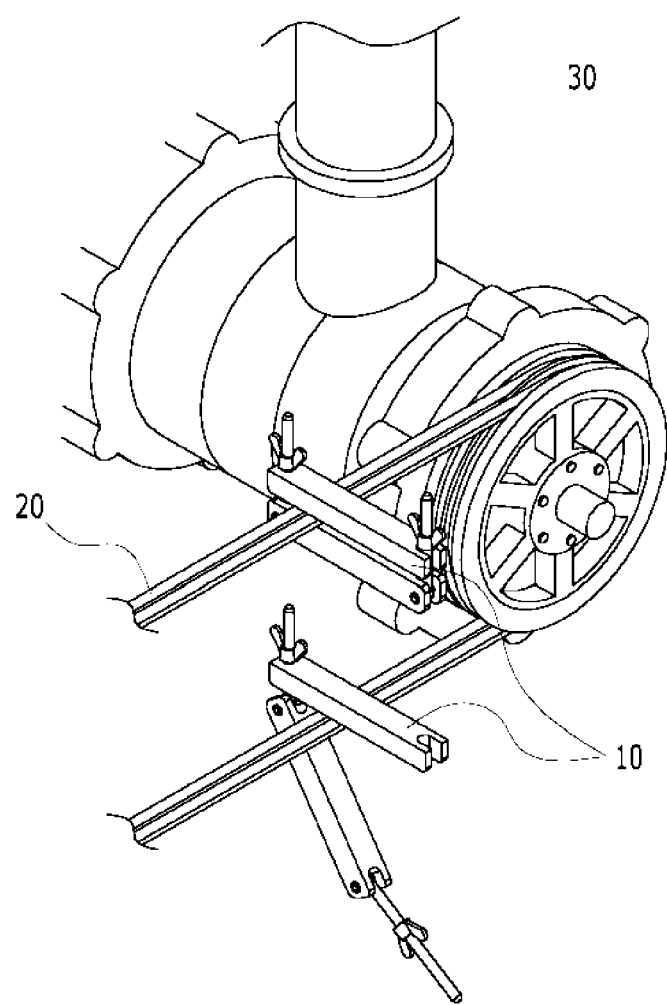
FIG. 4 is an illustration of a pulley apparatus with a pulley stopper coupled thereto according to another exemplary embodiment.

FIG. 4 is an illustration of a pulley apparatus with a pulley stopper coupled thereto.

As shown in FIG. 4, a pulley apparatus 30 according to an exemplary embodiment of the present invention may include a pulley stopper 10 that includes a clamp portion that includes bar-shaped upper and lower clamps and fasteners that are respectively disposed at opposite ends of the clamp portion to couple the upper clamp and the lower clamp, and the fastener and the clamp portion are coupled as a clip type such that the upper clamp and the lower clamp are fixed side by side through the coupling of the fastener, thereby stopping movement of a belt 20 disposed between the upper clamp and the lower clamp.

As described above, the present invention relates to a pulley stopper, which is intended to solve the problem of the conventional low versatility pulley device, and provides a highly versatile pulley stopper that can be used for various types of pulleys and V-belts, and simplifies a fastening process using a clip type of method such that a fastening process of the pulley stopper become easy.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS USED IN THE DRAWINGS

- 10: pulley stopper
- 20: belt
- 30: pulley apparatus
- 100: clamp portion
- 110: upper clamp
- 120: lower clamp
- 130: groove
- 200: fastener
- 210: first fastener
- 220: second fastener
- 230: bolt
- 240: nut
- 250: pin coupling portion
- 260: washer

The invention claimed is:

1. A pulley stopper comprising:
a clamp portion that comprises a bar-shaped upper clamp, a bar-shaped lower clamp, and a pair of pin coupling portions,
a pair of fasteners disposed at opposite ends of the clamp portion to couple the upper clamp and the lower clamp;
wherein the upper clamp and the lower clamp are fixed side by side through the coupling of the pair of fasteners to stop movement of a belt disposed between the upper clamp and the lower clamp,
wherein a first end of each of the pair of fasteners is coupled to a respective pin coupling portion, and a second end of each of the pair of fasteners is rotatable about a fixed axis of each respective pin coupling portion, and wherein the fixed axis of each pin coupling portion is perpendicular to a longitudinal axis of each of the pair of fasteners.

2. The pulley stopper of claim 1, wherein a first groove is formed in a side surface of the lower clamp and a second groove is formed in a side surface of the upper clamp, and wherein each of the pair of fasteners moves through the first and second grooves, when the second end of the respective fastener rotates.

3. The pulley stopper of claim 1, wherein the second end of each of the pair of fasteners is coupled to the upper clamp through rotation of a nut of each of the pair of fasteners to adjust a gap between the upper clamp and the lower clamp at each respective end.

4. The pulley stopper of claim 3, further comprising a washer provided in a portion where the nut of each of the pair of fasteners and the upper clamp contact each other.

5. The pulley stopper of claim 4, wherein a material of the washer is brass.

6. The pulley stopper of claim 3, wherein a material of a bolt of the fastener is selected from a monomer casting nylon (M/C nylon), phosphor bronze casting (PBC) and brass.

7. The pulley stopper of claim 1, wherein the pair of fasteners comprises:
a first fastener disposed at a first end of the clamp portion; and
a second fastener disposed in parallel with the first fastener at a second end of the clamp portion.

8. The pulley stopper of claim 7, wherein at least one of the first fastener and the second fastener is formed as a clip-type fastener.

9. The pulley stopper of claim 1, wherein a material of the clamp portion is monomer casting (M/C) nylon.

10. The pulley stopper of claim 1, wherein a material of the clamp portion is polyoxymethylene (POM).

11. A pulley apparatus comprising the pulley stopper of claim 1.

* * * * *